(12) United States Patent
Achrenius et al.

(10) Patent No.: US 12,154,224 B2
(45) Date of Patent: Nov. 26, 2024

(54) FINE GRAINED REPLAY CONTROL IN BINNING HARDWARE (71) Applicant: Advanced Micro Devices, Inc., Santa Clara, CA (US)

(72) Inventors: Jan H. Achrenius, Helsinki (FI); Kiia Kallio, Inkoo As (FI); Miikka Kangasluoma, Ulvila (FI); Ruijin Wu, San Diego, CA (US); Anirudh R. Acharya, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/033,023

(22) Filed: Sep. 25, 2020

(65) Prior Publication Data

US 2021/0398349 A1  Dec. 23, 2021

Related U.S. Application Data

(60) Provisional application No. 63/042,399, filed on Jun. 22, 2020.

(51) Int. Cl.
*G06T 17/10* (2006.01)
*G06T 1/20* (2006.01)
*G06T 15/00* (2011.01)

(52) U.S. Cl.
CPC ............. *G06T 17/10* (2013.01); *G06T 1/20* (2013.01); *G06T 15/005* (2013.01)

(58) Field of Classification Search
CPC .......... G06T 17/10; G06T 1/20; G06T 15/005
See application file for complete search history.

(56) References Cited

U.S. PATENT DOCUMENTS

| 2007/0146378 | A1* | 6/2007 | Sorgard | G06T 15/00 345/581 |
| 2011/0090220 | A1 | 4/2011 | Molnar et al. | |
| 2014/0118364 | A1 | 5/2014 | Hakura et al. | |
| 2014/0354640 | A1* | 12/2014 | Nystad | G06T 15/40 345/421 |
| 2015/0109293 | A1* | 4/2015 | Wang | G06T 15/405 345/422 |
| 2016/0322031 | A1 | 11/2016 | Liao et al. | |
| 2016/0328879 | A1* | 11/2016 | Jin | G06T 17/20 |

(Continued)

FOREIGN PATENT DOCUMENTS

GB 2433014 A 6/2007

OTHER PUBLICATIONS

Extended European Search Report for corresponding European Patent Application No. 21829043.5 dated Jul. 1, 2024 (7 pages long).

*Primary Examiner* — Sing-Wai Wu
*Assistant Examiner* — Khoa Vu
(74) *Attorney, Agent, or Firm* — Volpe Koenig (57) ABSTRACT

Some implementations provide systems, devices, and methods for rendering a plurality of primitives of a frame, the plurality of primitives being divided into a plurality of batches of primitives and the frame being divided into a plurality of bins. For at least one batch of the plurality of batches the rendering includes, for each of the plurality of bins, rendering primitives of a first sub-batch rasterizing to that bin, and for each of the plurality of bins, rendering primitives of a second sub-batch rasterizing to that bin.

20 Claims, 8 Drawing Sheets

(56) References Cited

U.S. PATENT DOCUMENTS

| | | | |
|---|---|---|---|
| 2016/0364901 A1* | 12/2016 | Balci | G06T 1/60 |
| 2017/0263039 A1* | 9/2017 | Goel | G06T 15/205 |
| 2018/0082469 A1 | 3/2018 | Andersson et al. | |
| 2018/0189925 A1* | 7/2018 | Lee | G09G 5/363 |
| 2019/0122417 A1 | 4/2019 | Mantor et al. | |
| 2020/0327731 A1* | 10/2020 | Zamora Esquivel | G06T 19/003 |

* cited by examiner

FINE GRAINED REPLAY CONTROL IN BINNING HARDWARE

CROSS REFERENCE TO RELATED APPLICATIONS

This application claims the benefit of U.S. Provisional Application No. 63/042,399, entitled "FINE GRAINED REPLAY CONTROL IN BINNING HARDWARE," filed Jun. 22, 2020, the contents of which is hereby incorporated by reference herein.

BACKGROUND

In computer graphics, objects are typically represented as a group of polygons, which are typically referred to as primitives in this context. The polygons are typically triangles, each represented by three vertices. Other types of polygon primitives are used in some cases, however triangles are the most common example. Each vertex includes information defining a position in three-dimensional (3D) space, and in some implementations, includes other information, such as color, normal vector, and/or texture information, for example.

BRIEF DESCRIPTION OF THE DRAWINGS

A more detailed understanding can be had from the following description, given by way of example in conjunction with the accompanying drawings wherein.

DETAILED DESCRIPTION

In some implementations, it is advantageous to render an entire frame in subsets, which may be referred to as bins or tiles. For example, in some implementations, the frame is divided into bins in the x-y plane and only primitives covered by pixels of a first bin are rendered before moving on to the next bin. This approach is referred to as binning for convenience. In some cases this has the advantage of increasing cache locality and data reuse during rendering, reducing the eviction rate of the rendering data from the cache.

Some implementations provide a processor configured to render a plurality of primitives of a frame. The processor includes circuitry configured to render the plurality of primitives of the frame. The plurality of primitives are divided into a plurality of batches of primitives. The frame is divided into a plurality of bins. For at least one batch of the plurality of batches the rendering includes, for each of the plurality of bins, rendering primitives of a first sub-batch rasterizing to that bin, and for each of the plurality of bins, rendering primitives of a second sub-batch rasterizing to that bin.

In some implementations the processor includes circuitry configured to cache the primitives of the at least one of the plurality of batches prior to rendering the primitives of the first sub-batch and the second sub-batch. In some implementations the processor includes circuitry configured to evict primitives of a different one of the plurality of batches prior to caching the primitives of the at least one of the plurality of batches. In some implementations rendering the primitives of the first sub-batch includes dispatching the primitives to a rendering pipeline in a first pass on one of the plurality of bins, and dispatching the primitives of the first sub-batch to the rendering pipeline in a second pass on the same one of the plurality of bins before moving on to a next bin.

In some implementations the first pass includes rasterization and the second pass includes rendering. In some implementations the first pass includes a Z test, and the second pass includes rendering. In some implementations, the second pass includes rendering based on results of the Z test. In some implementations the processor includes circuitry configured to cache the primitives of the at least one of the plurality of batches prior to rendering the primitives of the first sub-batch. In some implementations the first sub-batch includes primitives of an object and the second sub-batch includes primitives of a different object not in the first sub-batch. In some implementations the first sub-batch includes primitives having a different Z function than at the second sub-batch.

Some implementations provide a method of rendering a plurality of primitives of a frame. The method includes rendering the plurality of primitives of the frame, the plurality of primitives being divided into a plurality of batches of primitives and the frame being divided into a plurality of bins. For at least one batch of the plurality of batches the rendering includes, for each of the plurality of bins, rendering primitives of a first sub-batch rasterizing to that bin, and for each of the plurality of bins, rendering primitives of a second sub-batch rasterizing to that bin.

In some implementations the method includes caching the primitives of the at least one of the plurality of batches prior to rendering the primitives of the first sub-batch and the second sub-batch. In some implementations the method includes evicting primitives of a different one of the plurality of batches prior to caching the primitives of the at least one of the plurality of batches. In some implementations rendering the primitives of the first sub-batch includes dispatching the primitives to a rendering pipeline in a first pass on one of the plurality of bins, and dispatching the primitives of the first sub-batch to the rendering pipeline in a second pass on the same one of the plurality of bins before moving on to a next bin.

In some implementations the first pass includes rasterization, and the second pass includes rendering. In some implementations the first pass includes a Z test, and the second pass includes rendering. In some implementations the second pass includes rendering based on results of the Z test. In some implementations the method includes caching the primitives of the at least one of the plurality of batches prior to rendering the primitives of the first sub-batch. In some implementations the first sub-batch includes primitives of an object and the second sub-batch includes primitives of a different object not in the first sub-batch. In some implementations the first sub-batch includes primitives having a different Z function than the second sub-batch.

Figure 1:
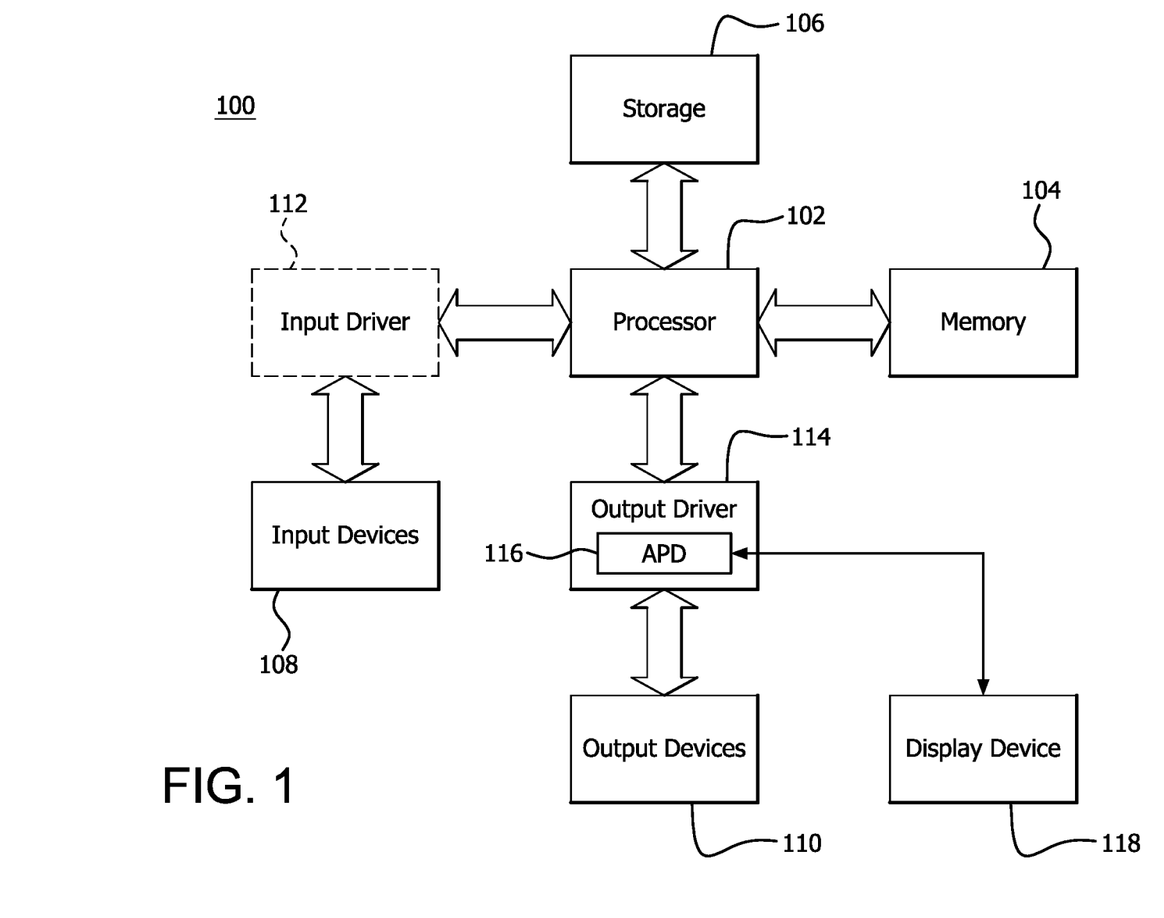
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
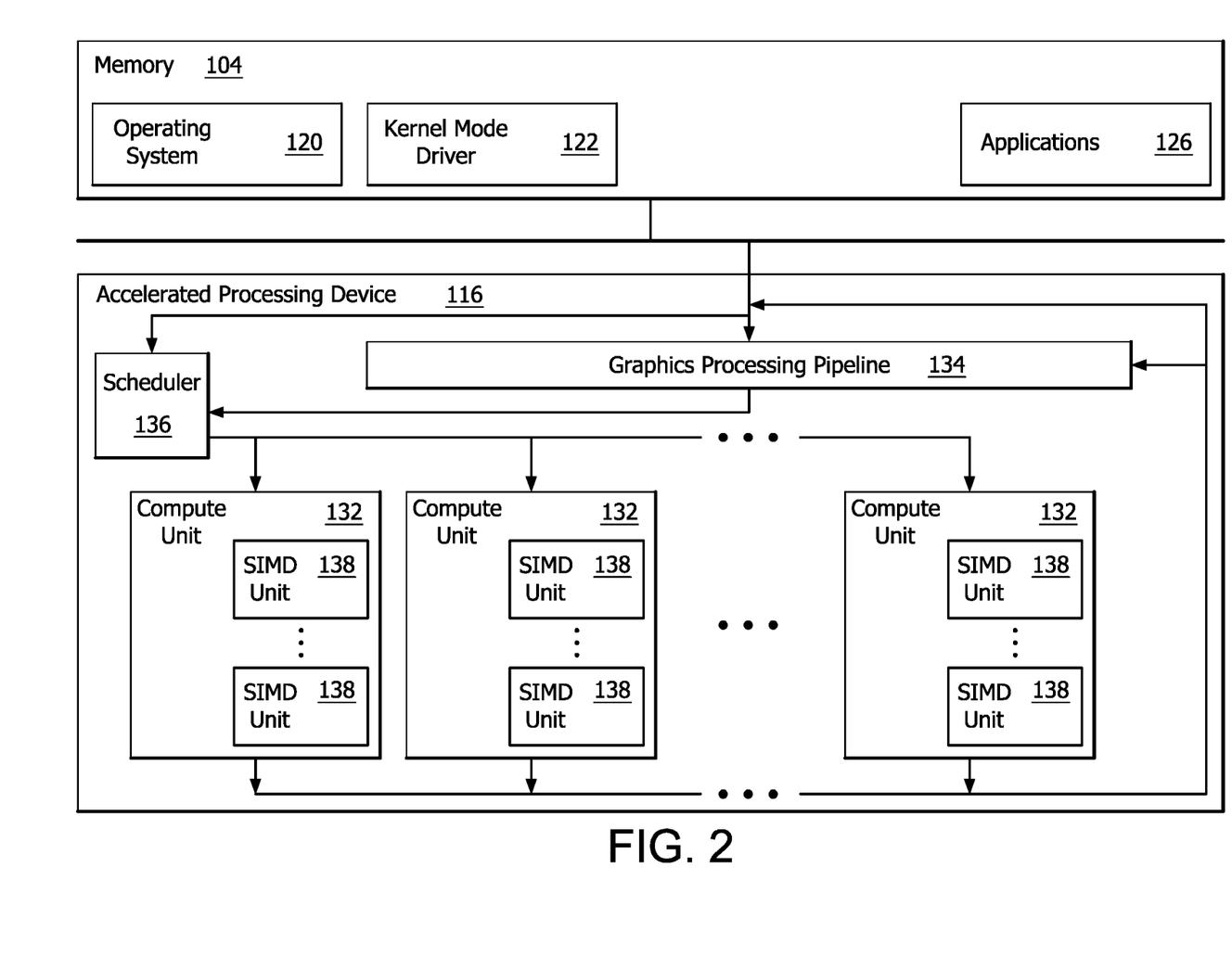
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
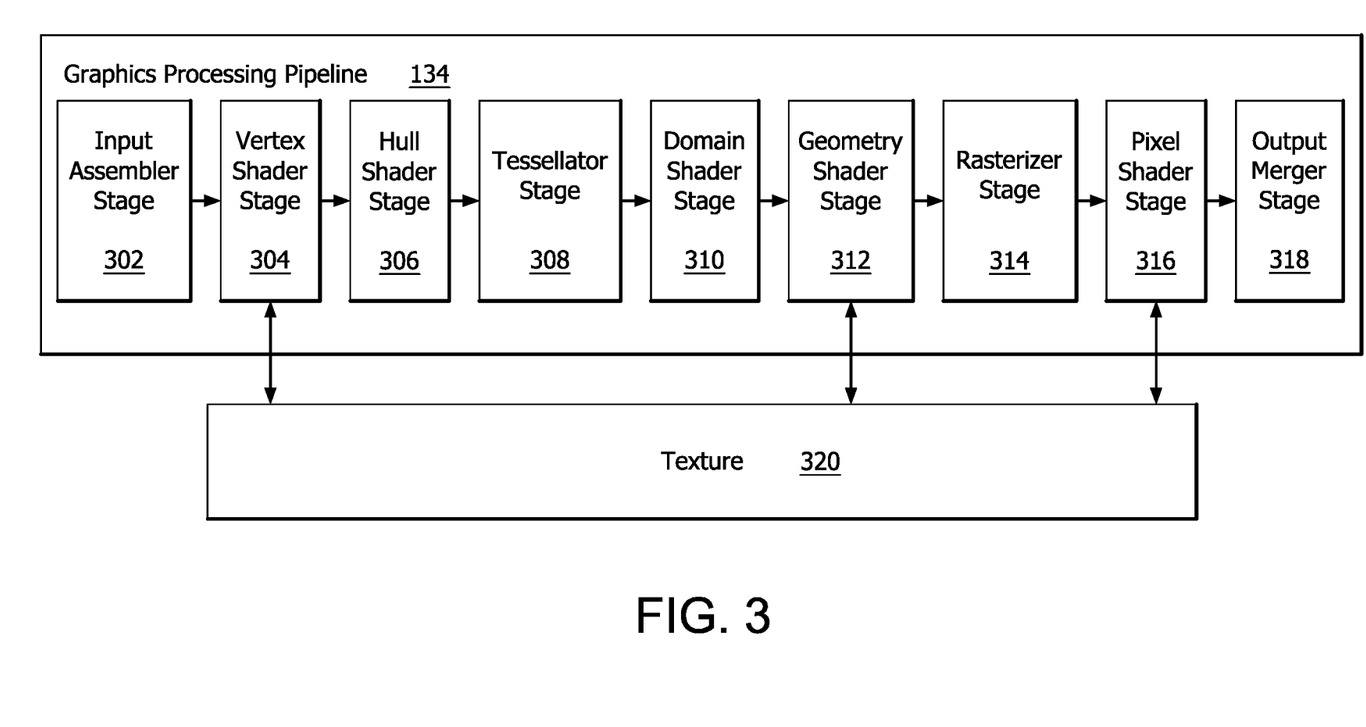
FIG. 3 is a block diagram illustrating a graphics processing pipeline, according to an example.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the programmable processing units 202 perform operations for the geometry shader stage 312.

The rasterizer stage 314 accepts and rasterizes simple primitives generated upstream. Rasterization includes determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

Texture data, which defines textures, are stored and/or accessed by the texture unit 320. Textures are bitmap images that are used at various points in the graphics processing pipeline 134. For example, in some instances, the pixel shader stage 316 applies textures to pixels to improve apparent rendering complexity (e.g., to provide a more "photorealistic" look) without increasing the number of vertices to be rendered.

In some instances, the vertex shader stage 304 uses texture data from the texture unit 320 to modify primitives to increase complexity, by, for example, creating or modifying vertices for improved aesthetics. In one example, the vertex shader stage 304 uses a height map stored in the texture unit 320 to modify displacement of vertices. This type of technique can be used, for example, to generate more realistic looking water as compared with textures only being used in the pixel shader stage 316, by modifying the position and number of vertices used to render the water. In some instances, the geometry shader stage 312 accesses texture data from the texture unit 320.

The performance of various computing operations in general, and specifically in a GPU, is increased in some cases by caching frequently used data in high speed special purpose memory. In some cases, attribute information (e.g., x, y, z, coordinates, color, texture, etc.) for all of the primitives being rendered for a frame exceeds the size of a cache or local memory used to store this information for processing. Accordingly, in some implementations, as mentioned above, it is advantageous to render the entire frame in subsets. Such subsets of a frame are typically referred to as bins or tiles. For example, in some implementations, the frame is divided into bins in the x-y plane and only primitives which are "covered by" (i.e., the 3D primitives project onto, or rasterize to, the 2D bin such that they overlap the bin in 2D space) pixels of a first bin are rendered before moving on to the next bin. This approach is referred to as binning for convenience. In some cases, binning has the advantage of increasing cache locality and data reuse during rendering, reducing the eviction rate of the rendering data from the cache.

Figure 4:
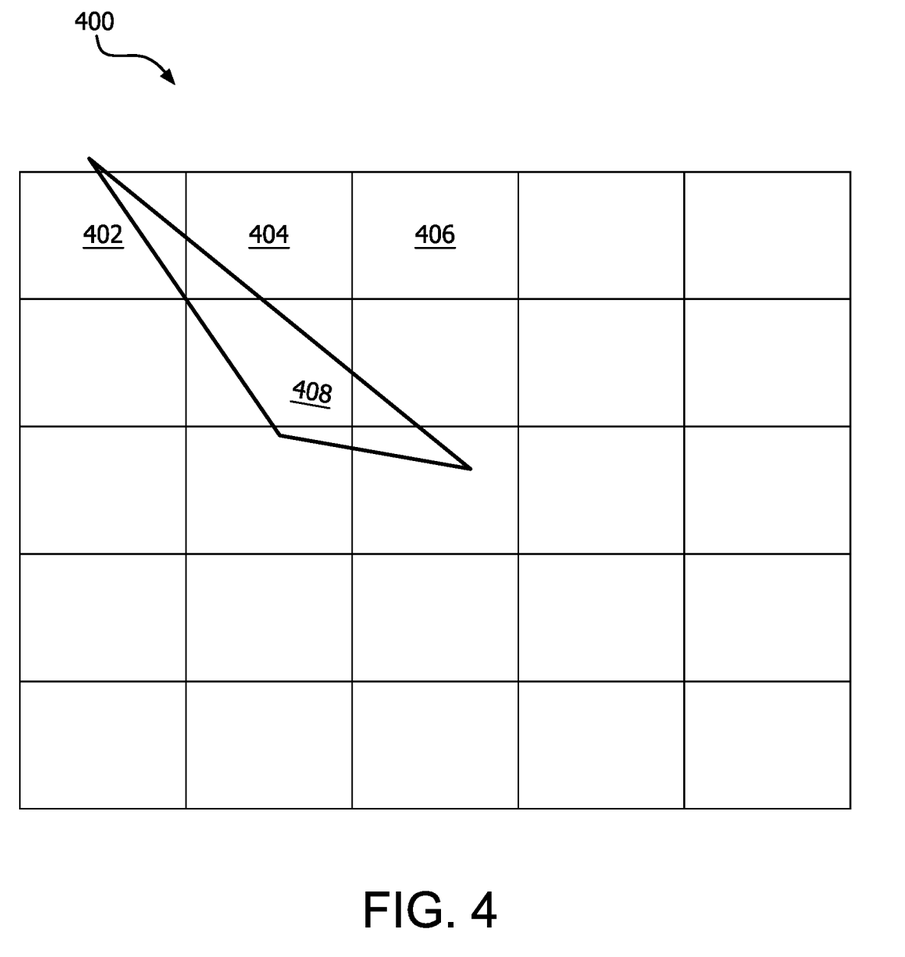
FIG. 4 is a block diagram of an example frame divided into bins.

FIG. 4 is a block diagram of an example frame 400 divided into bins. Frame 400 is divided into 25 bins in this example, although any suitable number of bins is possible. For convenience, only three of the bins, 402, 404, and 406 are labeled. Using a binning approach, only those primitives of frame 400 that are covered by pixels falling within bin 402 are rendered to begin with. An example primitive 408 is shown, which is covered by bin 402. After those primitives rasterizing to pixels falling within bin 402 are rendered, primitives rasterizing to pixels falling within bin 404 are rendered, and so forth to bin 406 and then to the other bins, until primitives rasterizing to pixels falling within each of the bins of frame 400 have been rendered.

In some implementations, cache locality and data reuse improvements are achieved. In this approach, a subset of primitives, referred to as a batch, is rendered with respect to each of the bins, one bin at a time. For each bin, batch primitives are each first rasterized to determine whether they are covered by pixels of a bin, after which the batch primitives determined to be covered by pixels of the bin are dispatched for rendering. In some implementations, this determination is made using a rasterization algorithm. The rasterization algorithm is part of the PBB in some implementations. After a batch has been rendered for each bin, one bin at a time, the next batch of primitives is rendered for each bin in the same way, one bin at a time, until all batches have been rasterized and rendered for all bins.

Special purpose hardware, referred to herein as PBB hardware, is used to "replay" the batch of primitives for each bin. In other words, the PBB hardware stores the primitives in the batch, and dispatches the primitives in the batch to the rendering pipeline once for each bin until the entire frame has been rendered.

The PBB hardware is configured to batch primitives (i.e., to store a subsets of the primitives) and to "replay" them (i.e., dispatch a stored batch of primitives for rendering) in different orders (e.g., in order of screen position for binning). In some implementations, the replay functionality of the PBB hardware is also usable for other techniques, such as Z pre-pass (ZPP) and light shaft optimization (LSO). ZPP and LSO are convenient examples to illustrate alternative uses of the PBB replay functionality herein, however it is noted that any suitable technique can make use of the PBB replay functionality in other implementations.

ZPP is a processing technique to reduce computational load by rasterizing overlapping triangles (e.g., of a batch, or which overlap pixels in a bin) once without color calculations to determine the "Z" or depth order of the triangles (i.e., which triangle is closest to the viewer, or alternatively, which triangle is furthest away, depending on Z function). The Z or depth information is recorded in a Z buffer for each sample. This rasterization is referred to as a Z pre-pass. After the sample closest to the viewer has been determined in the Z pre-pass, the triangles are "replayed" in a second pass to the rendering pipeline for color calculations, along with the Z information, using the replay functionality of the PBB hardware. Based on the Z information, the color calculation is only performed for the sample that is at the front (i.e., closest to the viewer). In some implementations, this has the advantage of improving performance by reducing processing load. LSO uses the replay functionality of the PBB hardware in a similar manner for light shaft optimization.

The PBB replay mechanism executes at the batch level. In other words, the first pass operates on a batch (i.e., a defined subset of primitives) before the "replay" (i.e., dispatch to the rendering pipeline) on the same batch (i.e., the same subset of primitives). For ZPP operations however, the Z calculations for all primitives in a first pass must be with respect to the same Z function. This is because the Z function determines the implication of the Z function for each primitive with respect to the other primitives (i.e., represents which triangle is closest to the front in "greater than" or GT mode of operation, or represents which triangle is closest to the back in "less than" or LT mode of operation). Accordingly, if the execution reaches a point where the Z function changes, the primitives following the Z function change are handled in a separate batch to facilitate correct operation. For LSO operations, the algorithm requires all the primitives of a light shaft geometry (e.g., a sphere) to be fully contained inside a batch, and there should be only one object inside each batch for best efficiency. In some implementations, this requires the batch to break at a drawcall boundary since each drawcall renders one object. A drawcall is a request sent from a CPU to the GPU asking it to draw an object.

Figure 5:
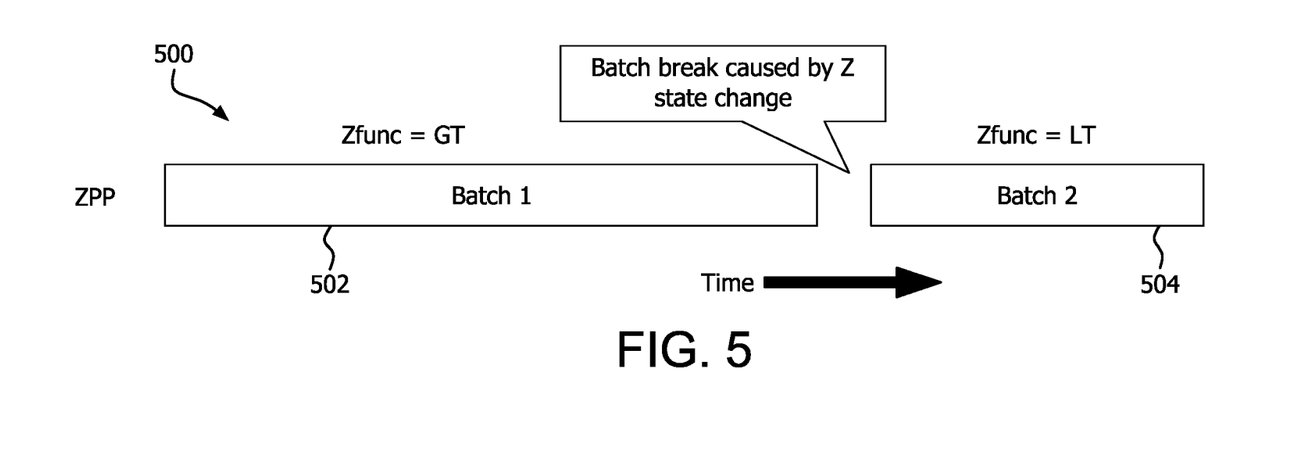
FIG. 5 is a block diagram illustrating example Z pre-pass (ZPP) operations with example batch breaks at Z function change boundaries.

FIG. 5 is a block diagram of example ZPP operations 500 which illustrate example batch breaks at Z function changes (also referred to as Z state change). Operations 500 include processing of a first batch 502 followed by processing of a second batch 504.

The primitives of batch 502 are batched separately from the primitives in batch 504 because the primitives in batch 502 are associated with a Z function that is different from the Z function associated with the primitives in batch 504. In this example, the primitives in batch 502 are associated with a "greater than" Z function (GT) and the primitives in batch 504 are associated with a "less than" Z function. The primitives in batch 502 are batched separately from the primitives in batch 504 due to the change in Z function even if they otherwise could be batched together (e.g., the maximum batch size could accommodate all of the primitives in one batch).

Batch 502 is processed in two passes for each bin of the frame. In the first pass, the primitives in batch 502 are sent to the rendering pipeline to rasterize the primitives, without color calculations, to determine the depth order of the primitives. This first pass is referred to as a Z pre-pass. The depth information is recorded in a Z buffer. After the sample closest to the view has been determined in the Z pre-pass, the primitives in batch 502 are sent to the rendering pipeline in a second pass for color calculations, along with the Z information from the Z buffer, using the replay functionality of the PBB hardware. Based on the Z information, the color calculation is only performed for the sample that is at the front (i.e., closest to the viewer) for that bin.

After the first and second passes are performed on batch 502 for a first bin of the frame, first and second passes are performed on batch 502 for a next bin, and so forth, until batch 502 has been rendered for each bin. After batch 502 has been rendered for each bin of the frame, batch 504 is processed in two passes for each bin of the frame in the same manner as batch 502.

Figure 6:
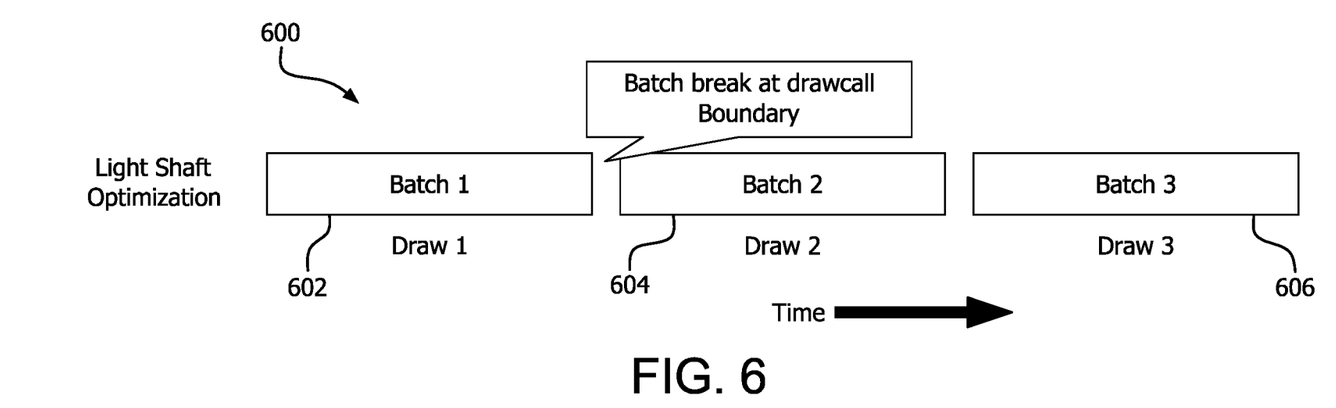
FIG. 6 is a block diagram illustrating example light-shaft optimization (LSO) operations with example batch breaks at drawcall boundaries.

FIG. 6 is a block diagram of example LSO operations 600 which illustrate example batch breaks at drawcall boundaries. Operations 600 include processing of a first batch 602, followed by processing of a second batch 604, followed by processing of a third batch 606.

The primitives of batch 602, batch 604, and batch 606 are batched separately because the LSO algorithm requires all primitives of a light shaft geometry (e.g., a sphere) to be fully contained inside a batch, and in some implementations, it is more efficient to have only one object inside each batch. If there are multiple objects inside a single batch, they interfere with each other in some cases, yielding incorrect results. Accordingly, the batches break at drawcall boundaries because each drawcall renders one object. The primitives of batch 602, batch 604, and batch 606 are batched separately due to the drawcall boundary even if they otherwise could be batched together (e.g., the maximum batch size could accommodate all of the primitives in one batch).

Batch 602 is processed in two passes for each bin of the frame. In the first pass, the rendering pipeline performs rasterization and Z-testing on the primitives of the batch for the bin, and the Z-test result is recorded. In the second pass, if any of the fragments from the first pass passed the Z-test, the rendering pipeline performs rasterization and Z-testing on the back facing triangle only to determine a representative fragment to represent a portion of a scene that falls inside a light shaft. After the first and second passes are performed on batch 602 for a first bin of the frame, first and second passes are performed on batch 602 for a next bin, and so forth, until LSO has been performed on batch 602 for each bin. After LSO has been performed on batch 602 for each bin of the frame, batch 604 is processed in two passes for each bin of the frame in the same manner as batch 602. Similarly, after LSO has been performed on batch 604 for each bin of the frame, batch 606 is processed in two passes for each bin of the frame in the same manner as batch 604

In some implementations, Z function or drawcall boundaries result in extra batch breaks beyond those used for PBB, effectively reducing the size of the batches. In some implementations, the effective reduction in batch size has a negative impact on cache eviction improvement and/or bandwidth reduction afforded by PBB. Reduction in batch size below that used for PBB for any other purpose would also potentially have a similar negative impact.

Accordingly, some PBB hardware implementations are configured to operate on sub-batches within a primitive batch. By facilitating a second level of replay, this approach has the advantage of supporting ZPP, LSO, and or other functionality which leverages the replay functionality of the PBB hardware, while also retaining the cache eviction improvement and/or bandwidth advantages of PBB. In some implementations, maintaining cached attribute information for all of the primitives in a batch while performing binned operations on sub-batches of the batch avoids or limits the negative impact on cache eviction improvement and/or bandwidth reduction afforded by PBB that may be caused by reducing the size of the batch.

Figure 7:
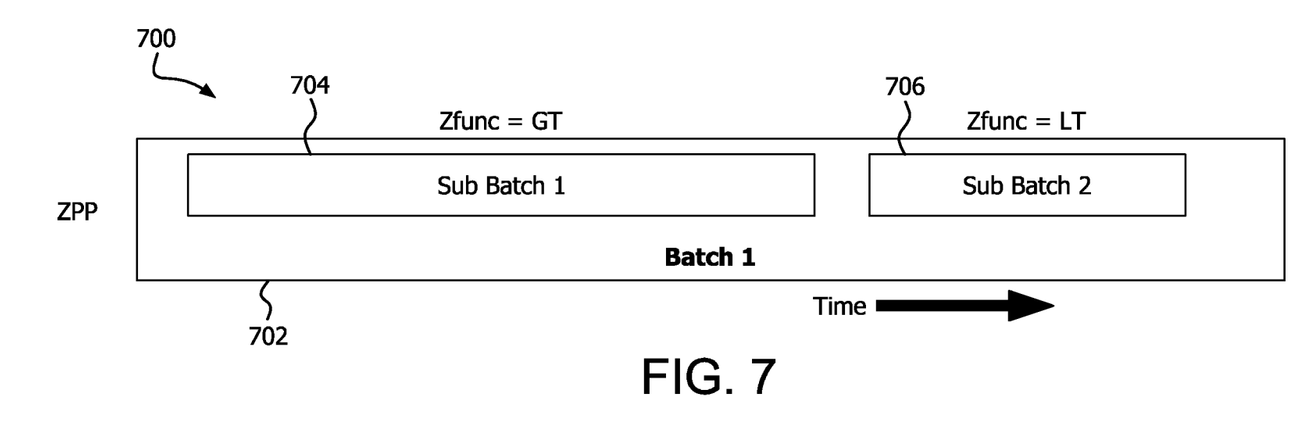
FIG. 7 is a block diagram illustrating example ZPP operations with example sub-batch breaks at Z function change boundaries.

FIG. 7 is a block diagram of example ZPP operations 700 which illustrate example sub-batch breaks at Z function change boundaries. In the example of FIG. 7, attribute information for all of the primitives in a first batch 702 is maintained in the cache while the PBB hardware dispatches the primitives of a first sub-batch 704 for two passes (one pass to determine GT mode Z functions for the primitives of sub-batch 704, and one pass to render the primitives of sub-batch 704 based on the determined Z functions) and then dispatches the primitives of sub-batch 706 for two passes (one pass to determine LT mode Z functions for the primitives of sub-batch 706, and one pass to render the primitives of sub-batch 706 based on the determined Z functions). After ZPP is performed by the PBB hardware for each of sub-batch 704 and sub-batch 706 for the current bin, the PBB hardware switches to the next bin and performs ZPP for sub-batch 704 and sub-batch 706 again.

Figure 8:
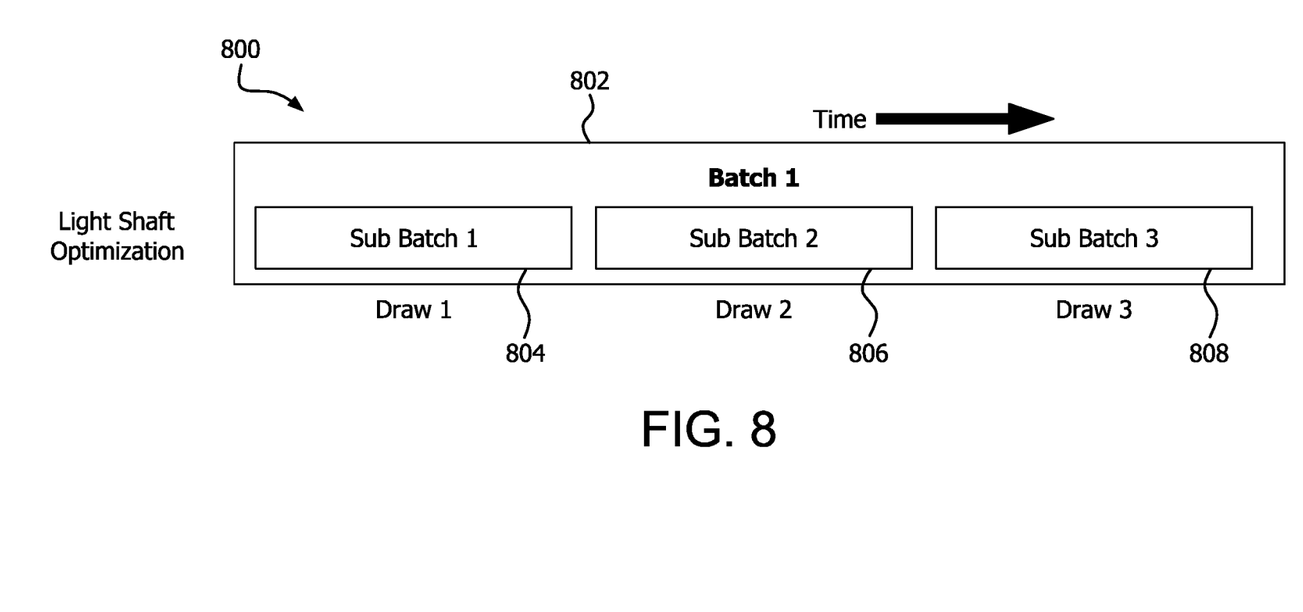
FIG. 8 is a block diagram illustrating example LSO operations with example sub-batch breaks at drawcall boundaries.

FIG. 8 is a block diagram of example LSO operations 800 which illustrate example sub-batch breaks at drawcall boundaries. In the example of FIG. 8, attribute information for all of the primitives in a first batch 802 is maintained in a cache (e.g., a color cache and/or a texture cache) while the PBB hardware dispatches the primitives of a first sub-batch 804 to the rendering pipeline for two passes for LSO, then dispatches the primitives of sub-batch 806 to the rendering pipeline for two passes for LSO, and then dispatches the primitives of sub-batch 808 to the rendering pipeline for two passes for LSO.

After LSO is performed by the PBB hardware for each of sub-batch 804, sub-batch 806, and sub-batch 808 for the current bin, the PBB hardware switches to the next bin and performs LSO for sub-batch 804, sub-batch 806, and sub-batch 808 again.

Table 1 includes pseudo-code describing PBB replay at the batch level (referred to as "typical PBB replay" for convenience), and Table 2 includes pseudo-code describing PBB replay at the sub-batch level (referred to as "PBB replay with sub-batches" for convenience), as discussed herein.

TABLE 1

```
//Typical PBB Replay
    For each batch {
        For each bin {
            Send primitives in current batch that cover the current bin;
            Resend the primitives in the current batch that cover the
            current bin;
                }
            }
```

TABLE 2

```
//PBB Replay with sub-batches
    For each batch {
        For each bin {
            For each sub-batch {
                Send primitives in current sub-batch that cover the
                current bin;
                Resend the primitives in the current sub-batch that
                cover the current bin;
                    }
                }
            }
```

In typical PBB replay, for each batch, for each bin, primitives of the current batch are sent to the graphics pipeline (e.g., for rasterization to determine which batch primitives are covered by the bin), after which the primitives of the current batch resent to the graphics pipeline (e.g., for rendering of the batch primitives determined to be covered by the bin).

In PBB replay with sub batches, for each batch, for each bin, for each sub-batch, primitives of the current sub-batch are sent to the graphics pipeline (e.g., to determine a Z order of the primitives), after which the primitives of the current batch resent to the graphics pipeline (e.g., for rendering of the batch primitive determined to be closest to the viewer in the Z direction).

Figure 9:
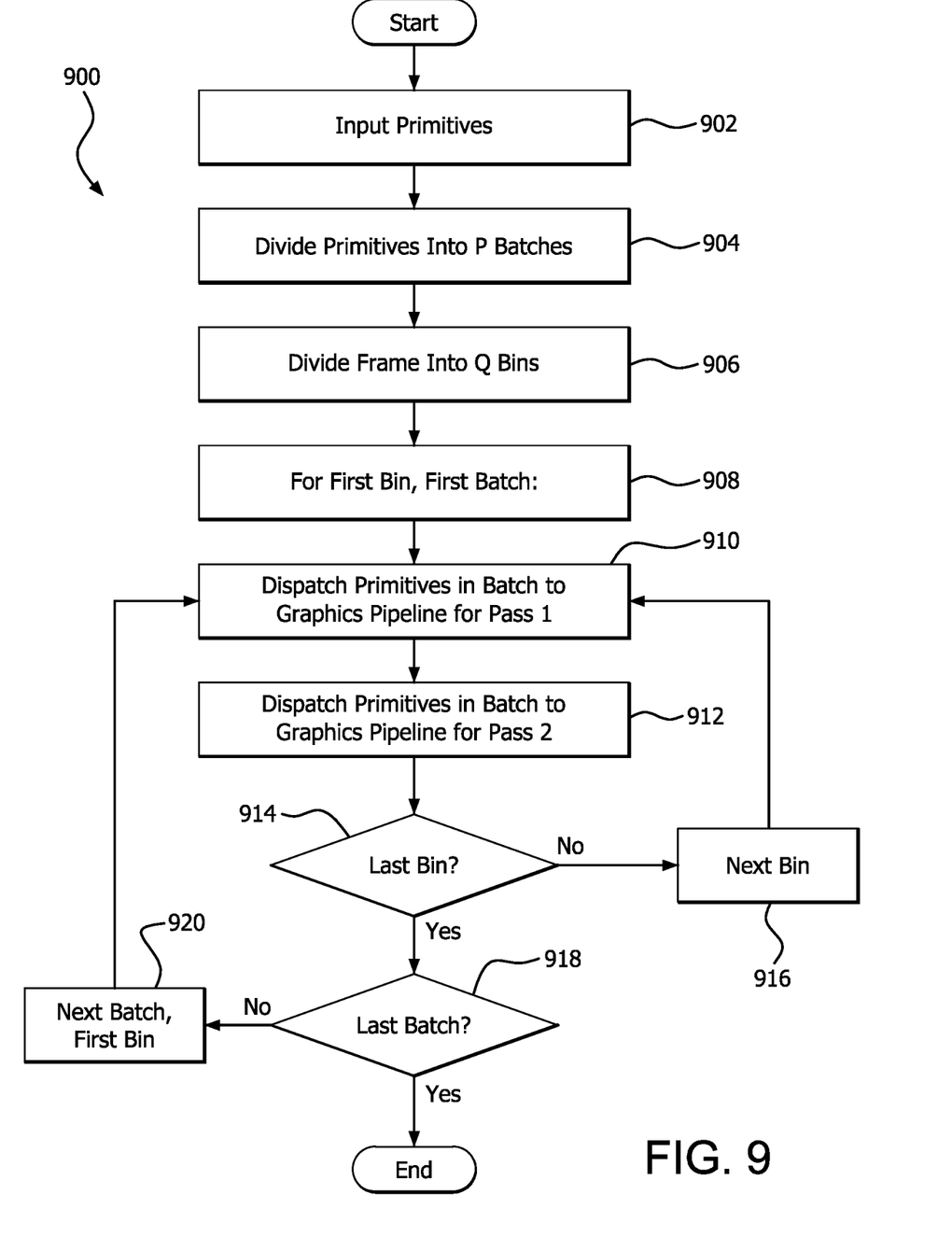
FIG. 9 is a flow chart illustrating example primitive batched binning (PBB)

FIG. 9 is a flow chart illustrating an example process 900 for PBB. In some implementations, process 900 or portions thereof is usable for ZPP operations or LSO operations, e.g., as discussed herein, or for other operations. In some implementations, process 900 is implemented using any suitable hardware, such as PBB hardware further described herein.

Primitives for a frame are input to a graphics processor in step 902. The primitives of the frame are divided into a plurality (P) of batches in step 904. The frame is divided into a plurality (Q) of bins in step 906. It is noted that steps 902, 904, and 906 can be performed in any suitable manner and/or in a different process. The current batch is set to the first of the P batches and the current bin is set to the first of the Q bins in step 908. This notation is simply for convenience, the batches and bins can be tracked using a counter or in any suitable manner, with or without the exemplary initialization step 908.

In step 910, the primitives of the current batch are buffered, and dispatched to the graphics pipeline for a first pass on the current bin. For example, in some ZPP processes, the first pass is a Z pre-pass, e.g., as discussed herein. After the first pass, the primitives of the current batch are dispatched to the graphics pipeline for a second pass ("replayed") on the current bin in step 912. For example, in some ZPP processes, the second pass renders color for a primitive closest to the viewer based on depth information determined in the first pass.

On condition 914 that the current bin is not the last batch of the Q bins, the current bin is advanced to the next batch in step 916 and the primitives of the current batch are buffered and are dispatched to the graphics pipeline for pass 1 on the current bin in step 910. On condition 914 that the current bin is the last batch of the Q bins, and on condition 918 that the current batch is the last bin of the P batches, process 900 ends. Otherwise, on condition 918 that the current batch is not the last batch of the R bins, the current batch is advanced to the next batch and the current bin is reset to the first bin in step 920, and the primitives of the new current batch are buffered and are dispatched to the graphics pipeline for pass 1 on the current bin in step 910.

Figure 10:
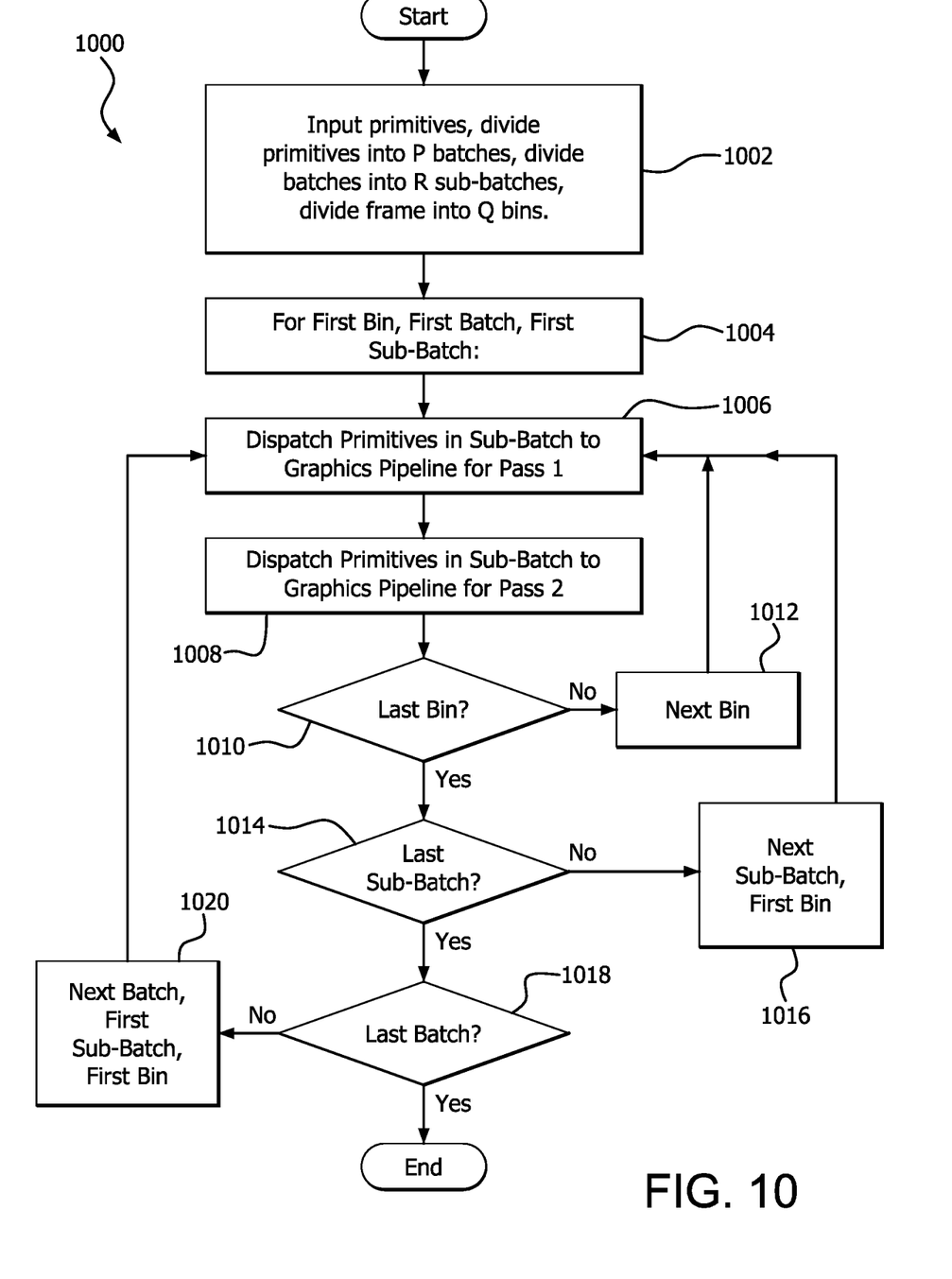
FIG. 10 is a flow chart illustrating example PBB with sub-batching.

FIG. 10 is a flow chart illustrating an example process 1000 for PBB replay with sub-batches. In some implementations, process 1000 or portions thereof is usable for ZPP operations or LSO operations, e.g., as discussed herein, or for other operations. In some implementations, process 1000 is implemented using any suitable hardware, such as PBB hardware further described herein.

Primitives for a frame are input to a graphics processor, the primitives of the frame are divided into a plurality (P) of batches, and the plurality of batches (P) are each divided into a plurality of sub-batches (R), and the frame is divided into a plurality (Q) of bins in step 1002. It is noted that in some implementations, each of batches P is divisible into a different number of sub-batches, is divisible into sub-batches each of a different size (i.e., number of primitives), and/or some batches may not be divided into sub-batches.

It is noted that step 1002 can be performed in any suitable manner and/or in a different process, and can be performed in a plurality of separate steps (e.g., as in process 900 as shown and described with respect to FIG. 9) or combinations of steps.

The current batch is set to the first of the P batches, the primitives of the first of the P batches are buffered, the current sub-batch is set to the first of the R sub-batches, and the current bin is set to the first of the Q bins in step 1004. This notation is simply for convenience, the batches, sub-batches, and bins are tracked using a counter or in any suitable manner in some implementations, with or without the exemplary initialization step 1004.

In step 1006, the primitives of the current sub-batch are dispatched to the graphics pipeline for a first pass on the current bin. For example, in some ZPP processes, the first pass is a Z pre-pass, e.g., as discussed herein. After the first pass, the primitives of the current sub-batch are dispatched to the graphics pipeline for a second pass ("replayed") on the current bin in step 1008. For example, in some ZPP processes, the second pass renders color for a primitive closest to the viewer based on depth information determined in the first pass.

On condition 1010 that the current bin is not the last bin of the Q bins, the current bin is advanced to the next bin in step 1012 and the primitives of the current sub-batch are dispatched to the graphics pipeline for pass 1 on the new current bin in step 1006. On condition 1010 that the current bin is the last bin of the Q bins, it is determined whether the current sub-batch is the last of the R sub-batches.

On condition 1014 that the current sub-batch is not the last sub-batch of the R sub-batches, the current sub-batch is advanced to the next sub-batch of the R sub-batches of the current batch in step 1016, and the primitives of that sub-batch are dispatched to the graphics pipeline for pass 1 on the current bin in step 1006. On condition 1014 that the current sub-batch is the last sub-batch of the R sub-batches, it is determined whether the current batch is the last of the P batches.

On condition 1018 that the current bin is the last bin of the Q bins, process 1000 ends. Otherwise, on condition 1018 that the current batch is not the last bin of the P batches, the current batch is advanced to the next batch of the P batches, the current sub-batch is reset to the first sub-batch of the next batch, and the current bin is reset to the first bin of the Q bins in step 1020, and the primitives of the first sub-batch of the new current batch are dispatched to the graphics pipeline for pass 1 on the first bin in step 1006

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processor configured to render a plurality of primitives of a frame, the processor comprising:
circuitry configured to render the plurality of primitives of the frame, the plurality of primitives divided into a plurality of batches of primitives, the frame divided into a plurality of bins;
wherein for at least one batch of the plurality of batches the rendering includes:
for each of the plurality of bins, rendering primitives of a first sub-batch rasterizing to that bin in a first pass, and
rendering primitives of a second sub-batch rasterizing to that bin in a second pass.

2. The processor of claim 1, further comprising circuitry configured to cache the primitives of the at least one of the plurality of batches prior to rendering the primitives of the first sub-batch and the second sub-batch.

3. The processor of claim 2, further comprising circuitry configured to evict primitives of a different one of the plurality of batches prior to caching the primitives of the at least one of the plurality of batches.

4. The processor of claim 1, wherein rendering the primitives of the first sub-batch comprises dispatching the primitives to a rendering pipeline in a first pass on one of the plurality of bins, and dispatching the primitives of the first sub-batch to the rendering pipeline in a second pass on the same one of the plurality of bins before moving on to a next bin.

5. The processor of claim 4, wherein the first pass comprises rasterization, and the second pass comprises rendering.

6. The processor of claim 4, wherein the first pass comprises a Z test, and the second pass comprises rendering.

7. The processor of claim 6, wherein the second pass comprises rendering based on results of the Z test.

8. The processor of claim 1, further comprising circuitry configured to cache the primitives of the at least one of the plurality of batches prior to rendering the primitives of the first sub-batch.

9. The processor of claim 1, wherein the first sub-batch comprises primitives of an object and the second sub-batch comprises primitives of a different object not in the first sub-batch.

10. The processor of claim 1, wherein the first sub-batch comprises primitives having a different Z function than at the second sub-batch.

11. A method of rendering a plurality of primitives of a frame, the method comprising:
rendering the plurality of primitives of the frame, the plurality of primitives divided into a plurality of batches of primitives, the frame divided into a plurality of bins;
wherein for at least one batch of the plurality of batches the rendering includes:
for each of the plurality of bins, rendering primitives of a first sub-batch rasterizing to that bin in a first pass, and
rendering primitives of a second sub-batch rasterizing to that bin in a second pass.

12. The method of claim 11, further comprising caching the primitives of the at least one of the plurality of batches prior to rendering the primitives of the first sub-batch and the second sub-batch.

13. The method of claim 12, further comprising evicting primitives of a different one of the plurality of batches prior to caching the primitives of the at least one of the plurality of batches.

14. The method of claim 11, wherein rendering the primitives of the first sub-batch comprises dispatching the primitives to a rendering pipeline in a first pass on one of the plurality of bins, and dispatching the primitives of the first sub-batch to the rendering pipeline in a second pass on the same one of the plurality of bins before moving on to a next bin.

15. The method of claim 14, wherein the first pass comprises rasterization, and the second pass comprises rendering.

16. The method of claim 14, wherein the first pass comprises a Z test, and the second pass comprises rendering.

17. The method of claim 16, wherein the second pass comprises rendering based on results of the Z test.

18. The method of claim 11, further comprising caching the primitives of the at least one of the plurality of batches prior to rendering the primitives of the first sub-batch.

19. The method of claim 11, wherein the first sub-batch comprises primitives of an object and the second sub-batch comprises primitives of a different object not in the first sub-batch.

20. The method of claim 11, wherein the first sub-batch comprises primitives having a different Z function than the second sub-batch.

* * * * *